United States Patent
Williams

(10) Patent No.: US 9,201,921 B2
(45) Date of Patent: Dec. 1, 2015

(54) METHODS AND SYSTEMS FOR OFFLINE EXECUTION OF RICH INTERNET APPLICATIONS

(75) Inventor: Jason Williams, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1616 days.

(21) Appl. No.: 11/934,409

(22) Filed: Nov. 2, 2007

(65) Prior Publication Data

US 2014/0258460 A1 Sep. 11, 2014

(51) Int. Cl.
*G06F 17/30* (2006.01)

(52) U.S. Cl.
CPC .................... *G06F 17/30374* (2013.01)

(58) Field of Classification Search
CPC ............... G06F 17/30374; G06F 17/30578; H04L 67/1095
USPC ......................................................... 709/219
See application file for complete search history.

(56) References Cited

U.S. PATENT DOCUMENTS

| | | | | |
|---|---|---|---|---|
| 6,523,036 B1 * | 2/2003 | Hickman et al. | | 1/1 |
| 6,578,054 B1 * | 6/2003 | Hopmann et al. | | 1/1 |
| 6,941,310 B2 * | 9/2005 | Ahad et al. | | 1/1 |
| 7,143,419 B2 * | 11/2006 | Fischer et al. | | 719/328 |
| 7,275,105 B2 * | 9/2007 | Bloch et al. | | 709/227 |
| 7,305,475 B2 * | 12/2007 | Tock | | 709/227 |
| 7,526,561 B2 * | 4/2009 | Bloch et al. | | 709/229 |
| 7,664,788 B2 * | 2/2010 | Aust | | 709/248 |
| 7,680,941 B2 * | 3/2010 | Bloch et al. | | 709/227 |
| 7,899,917 B2 * | 3/2011 | Chitre et al. | | 709/228 |
| 7,966,426 B2 * | 6/2011 | Smith et al. | | 709/248 |
| 8,255,921 B2 * | 8/2012 | Arvidsson et al. | | 719/311 |
| 9,083,765 B2 * | 7/2015 | Rehman et al. | | 1/1 |
| 2002/0026474 A1 * | 2/2002 | Wang et al. | | 709/203 |
| 2002/0111995 A1 * | 8/2002 | Mansour et al. | | 709/203 |
| 2003/0158947 A1 * | 8/2003 | Bloch et al. | | 709/227 |
| 2003/0233404 A1 * | 12/2003 | Hopkins | | 709/203 |
| 2004/0064570 A1 * | 4/2004 | Tock | | 709/228 |
| 2006/0064470 A1 * | 3/2006 | Sargent et al. | | 709/219 |
| 2007/0078950 A1 * | 4/2007 | Hopkins et al. | | 709/217 |
| 2007/0078992 A1 * | 4/2007 | Bloch et al. | | 709/228 |
| 2008/0147781 A1 * | 6/2008 | Hopmann et al. | | 709/203 |
| 2008/0208806 A1 * | 8/2008 | Dalfo et al. | | 707/3 |
| 2008/0222548 A1 * | 9/2008 | Cohen et al. | | 715/770 |
| 2009/0094332 A1 * | 4/2009 | Schemers et al. | | 709/206 |

OTHER PUBLICATIONS

Adobe, "Knowledge Base Guided Search," web page at http://kb_adobe_com/selfservice/microsites/search.do, as available via the Internet and printed Sep. 9, 2007.

(Continued)

*Primary Examiner* — Derrick Ferris
*Assistant Examiner* — Scott M Sciacca
(74) *Attorney, Agent, or Firm* — Kilpatrick Townsend & Stockton LLP

(57) ABSTRACT

Methods for offline execution of Rich Internet Applications are disclosed. In one embodiment, the method includes receiving at a remote destination a client value of a Rich Internet Application (RIA) information for an RIA from a client, wherein the RIA information is stored and modified on the client before being received by the remote destination. The method further includes determining if the client value is to replace a remote destination value of the RIA information stored on the remote destination. The method further includes replacing the remote destination value with the client value to synchronize the RIA information between the client and the remote destination when it is determined that the client value is to replace the remote destination value.

12 Claims, 12 Drawing Sheets

(56) References Cited

OTHER PUBLICATIONS

Adobe Flash Article, "Macromedia-Developer Center—Updating a Database Using Flash MX Professional 2004," web page at http //www.adobe com/devnet/flash/articles/delta_packet_print html, as available via the Internet and printed Sep. 6, 2007.

Macromedia Flash MX, Using Components-Chapter 6: Component Dictionary, pp. 304-306, Macromedia Inc, Second Edition Jun. 2004.
Macromedia Flash MX, Using Flash-Chapter 14: Data Integration (Flash Professional Only), pp. 281-286, Macromedia Inc, Second Edition Jun. 2004.

* cited by examiner

METHODS AND SYSTEMS FOR OFFLINE EXECUTION OF RICH INTERNET APPLICATIONS

FIELD OF THE INVENTION

This invention relates generally to the field of data processing systems. More particularly, the invention relates to systems and methods for execution of Rich Internet Applications.

BACKGROUND

Rich Internet Applications (RIA) are typically programs running on a server but act as traditional local applications. For example, a document processor may run on a server but be controlled by a user of a client device connected to the server. The client, instead of having to store every document, serves as a courier between the server and user. As today's electronic devices become more connected, RIAs are assuming a more prevalent role in data processing and application execution.

RIAs typically require a constant connection to a server. For example, if a document processor is being controlled by a user from his desktop, a constant connection (e.g., via the Internet) is kept open with the server. The connection is kept open in order for any changes or actions made by the user are forwarded to the server. One problem is that devices may not always be connected to the server when the user wishes to execute a program. In one example, a user may wish to run the document processor when no wireless internet connection exists for his device. As a result, the user would have to wait until a connection was established at a later point in order to run the program. Also, an RIA is shut down before a save if the connection is lost between the server and client. Hence, the current state of any RIA information is lost. Another problem is that information must be continually passed between the client and the server during execution of an RIA. As a result, transceiver bandwidth may be consumed for execution of the RIA instead of other applications requiring communication with other devices. Another problem is that technologies today limit the number of clients that may simultaneously connect to a server in executing an RIA. The server may only have, for example, 64 sockets to allow 64 clients at one time to execute the RIA. Another problem is that synchronization must occur between a client and the server, again requiring a connection between the client and the server.

SUMMARY

Methods for offline execution of Rich Internet Applications are disclosed. In one embodiment, the method includes receiving at a remote destination a client value of a Rich Internet Application (RIA) information for an RIA from a client, wherein the RIA information is stored and modified on the client before being received by the remote destination. The method further includes determining if the client value is to replace a remote destination value of the RIA information stored on the remote destination. The method further includes replacing the remote destination value with the client value to synchronize the RIA information between the client and the remote destination when it is determined that the client value is to replace the remote destination value.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF PREFERRED EMBODIMENTS

Figure 1:
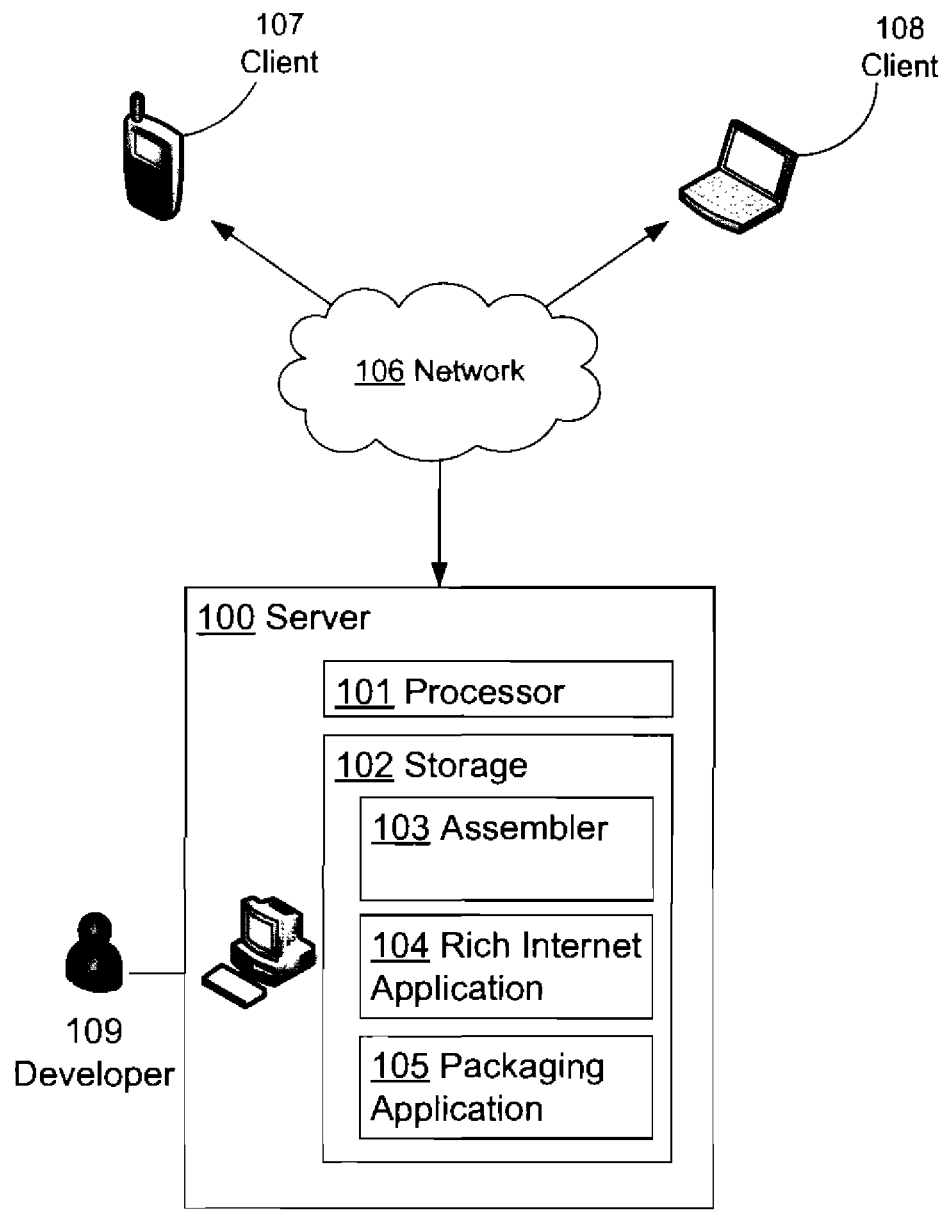
FIG. 1 shows an illustrative system of a server and clients connected to one another for offline execution of Rich Internet Applications (RIAs).

Embodiments of the present invention comprise systems, methods, and products for execution of Rich Internet Applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Rich Internet Applications (RIAs) are internet applications that behave much like a desktop or local application. For example, most computers today execute a local application for editing documents, such as MS Word® or Open Office. A growing number of users, though, use internet applications, such as Google® Documents, to edit and store documents. The internet application allows much of the same user functionality as the local application, but the processing and storing of information occurs on a remote destination (e.g., a server) instead of the user's desktop. For example, when a user uses an internet application (e.g., Google® Documents) for editing a document instead of a local application (e.g., MS Word®), the document is stored on a server that is connected to by the user's device (thus a client of the server). The server also performs a majority of the processing power required by the application, such as performing all of the edits to a document requested by the user.

Hence, the user's device, as a client of the remote destination, acts as a window into the remote destination to allow the user access to the document. Since the client acts as a window into the remote destination, the client does not store many files required by the Rich Internet Application. In the example of the internet application for document editing, the client does not store the document or many portions of a kernel involved in saving files and editing the document. The client may simply store a program or protocol for connecting to the server and for accessing the internet application in order to edit the document stored on the server. Since the client does not store a lot of the information required to locally execute an application, the RIA executed on a client typically requires a constant connection to the server. For example, when editing and saving a document on the internet application, a connection to the server is maintained during the editing and saving of the document.

RIA information is the information for a client to execute the RIA without needing a connection to a remote destination. For example, in document editing, the RIA information may include, but is not limited to, the document itself, document tags or other information (author, date created, etc.), the RIA (including a user interface) to allow local execution as well as execution during connection to the server, and a kernel that allows editing and saving of a document on the local processor and storage or the remote destination processor and storage.

In one embodiment, a developer of the RIA programs the RIA such that the RIA requires the RIA information to be stored on the client. Hence, a client user may run the RIA locally on the client without being connected to the remote destination. To do so, information to execute the RIA locally is sent from the remote destination and stored on the client with synchronization of any changed RIA information between the remote destination and client occurring when the client again establishes a connection.

In the example of document editing, changes to a document are stored in the client (e.g., in storage) until a connection is established with the server such that the client may send the changes to the server to update the document stored on the server. Therefore, the client may send the entire amended document to the server during connection or the edits in order for the server to perform the edits on the stored document in server storage. Hence, the client allows local execution or execution through a network of the application.

In another embodiment, clients of a remote destination (e.g., server) may also act as a remote destination for other clients. Therefore, a first client would synchronize with a second client and thus replace a server for sending/receiving data to/from the second client. Hence, bandwidth for synchronization may be offloaded from a central server to other devices and free a server's resources for other applications. In one embodiment, the transactions among the client(s) and remote destination and the storage of RIA information on a client are Atomic, Consistent, Isolated, and Durable (ACID) in order to preserve the integrity of the data between a plurality of devices. In addition, all RIA information may be in relational storage of a device in order to allow better management of versions and reduce conflicts between RIA information stored on multiple devices.

Illustrative System for Executing Rich Internet Applications

FIG. 1 illustrates one embodiment of the server 100 connected to a plurality of clients (107, 108) through a network 106 in order to execute the methods of FIGS. 3-11. The server 100 generally includes a processor 101 and a storage 102 connected to the processor 101 to execute and store an assembler 103, an RIA 104, and a packaging application 105. The server 100 may further include a terminal or user interface to allow a developer 109 access to the server 100 in order to, for example, program or amend an Application Program Interface (API) between the programs/applications located on the server 100.

In one embodiment, the assembler 103 is an application that converts byte code into machine language. Each computer architecture requires a specific machine language. Therefore, in order for the device (client or server) to understand the instructions stored in byte code, the assembler 103 is executed by the processor 101 in order to convert the byte code into machine language. The assembler 103 thus allows, for example, the RIA 104 to be stored as byte code on each device (client or server). Hence, the RIA 104 does not need to be converted from one machine language to another when being transferred between devices. The byte code may instead be transferred. Hence, in one embodiment, when RIA information is to be executed, the assembler 103 converts the RIA information from byte code to machine language specific for that device's architecture. Alternatively, the assembler 103 may convert byte code as received so that machine language is stored or convert machine language, when it is to be transmitted, into byte code. In another embodiment, assembler 103 may be a cross assembler so as to convert the byte code into machine language for the intended client 107, 108.

In one embodiment, packaging application 105 is an application to prepare data to be sent over the network 106. For example, the packaging application 105 may prepare the RIA information for transmission over the network 106 from the server 100 to the client 107,108. In one embodiment, the packaging application 105 receives RIA information (or any other information) to be sent to the client 107,108 and creates data packets for transmission over the network 106. The packaging application 105 also breaks apart or disassembles received data packets into information (e.g., RIA information) to be stored on the server 100. In one embodiment, the packaging module may create an identifier for each packet (e.g., a header or unique signature) so that each client may recognize whether or not the data packet is intended for the client.

Figure 2A:
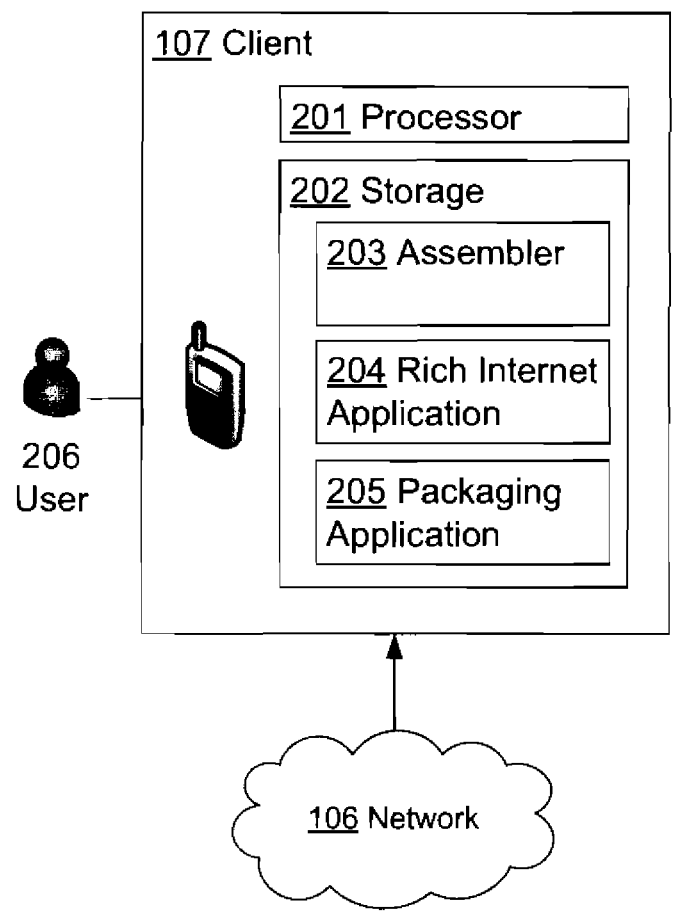
FIG. 2a illustrates an embodiment of the client 107 in FIG. 1.

Referring to FIG. 2a, client 107 is illustrated as an example client to be connected to a remote destination (e.g., client 108 or server 100) via network 106. In one embodiment, client 107 generally includes a processor 201 and a storage 202 to execute and store an assembler 203, an RIA 204, and a packaging application 205. In one embodiment, the assembler 203 and packaging application 205 are similar to assembler 103 and packaging application 105 and thus perform similar functions. Client 107 may also include a user interface for a user 206 to interact with the client 107.

Figure 2B:
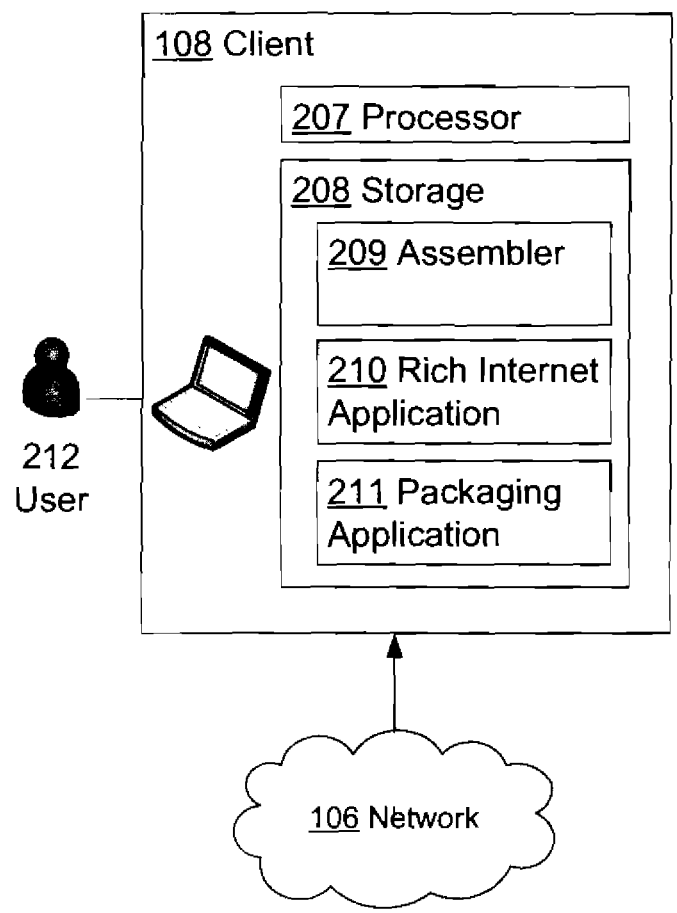
FIG. 2b illustrates an embodiment of the client 108 in FIG. 1.

Referring to FIG. 2b, client 108 is illustrated as an example client to also be connected to a remote destination (e.g., client 107 or server 100) via network 106. As for client 107, client 108 generally includes a processor 207 and a storage 208 to execute and store an assembler 209, an RIA 210, and a packaging application 211. Client 108 may also include a user interface for a user 212 to interact with the client 108. In one embodiment, all other clients connected to server 100 via network 106 may include the same modules as clients 107 and 108. The described server 100 and clients 107, 108 connected by network 106 is one illustrative system for synchronizing RIA information and executing an RIA by a client independently from a remote destination, as illustrated in the methods of FIGS. 3-11, described below.

Exemplary Method for Remote Destination/Client Synchronization and Execution

Figure 3:
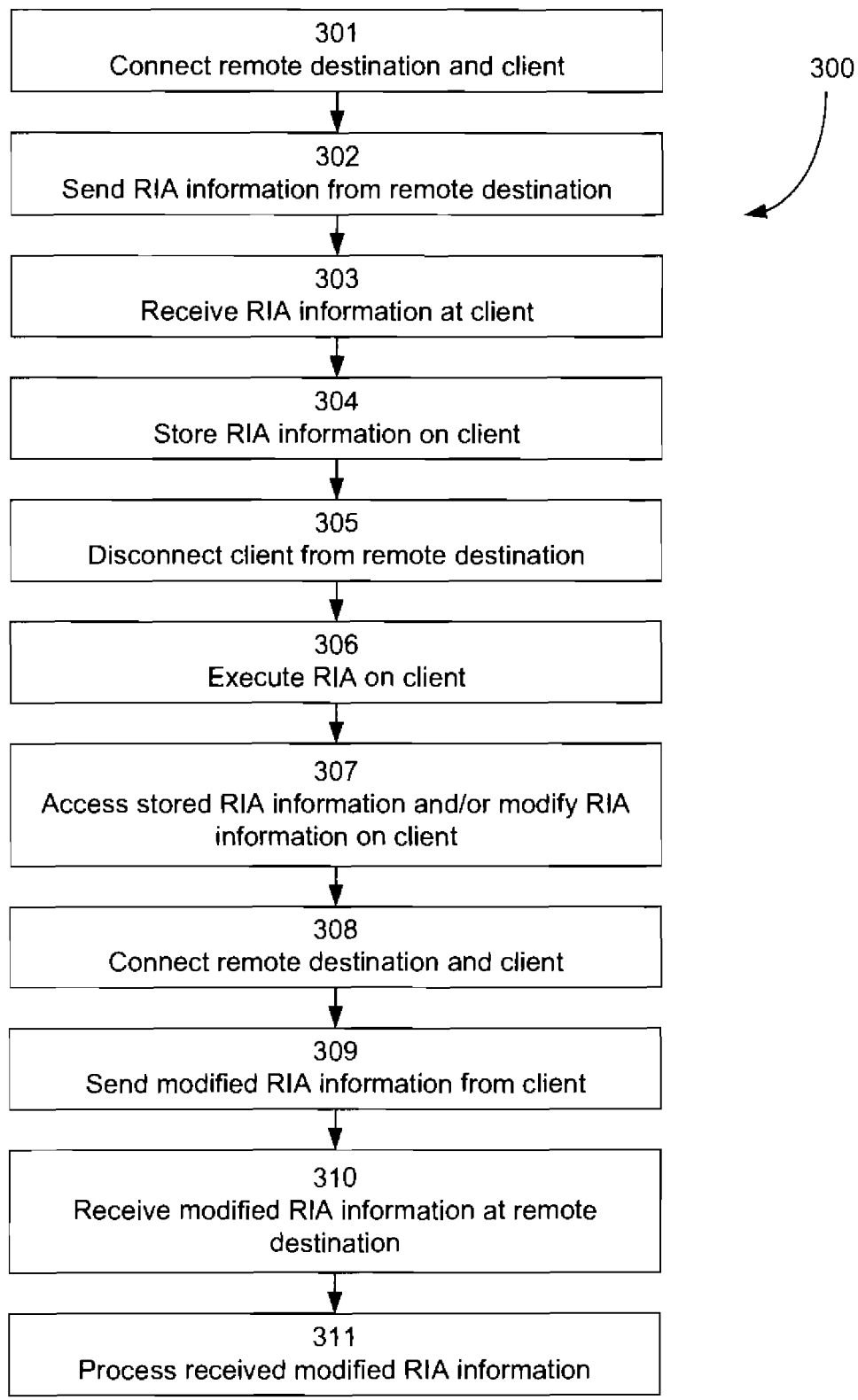
FIG. 3 illustrates an exemplary method 300 for offline execution and synchronization of an RIA on the client 107 and remote destination in FIG. 1.

FIG. 3 illustrates an exemplary method 300 for offline execution of an RIA 204 on the client 107 and synchronization of RIA information between the client 107 and the remote destination.

Synchronizing Remote Destination/Client for Receiving RIA Information

Figure 4:
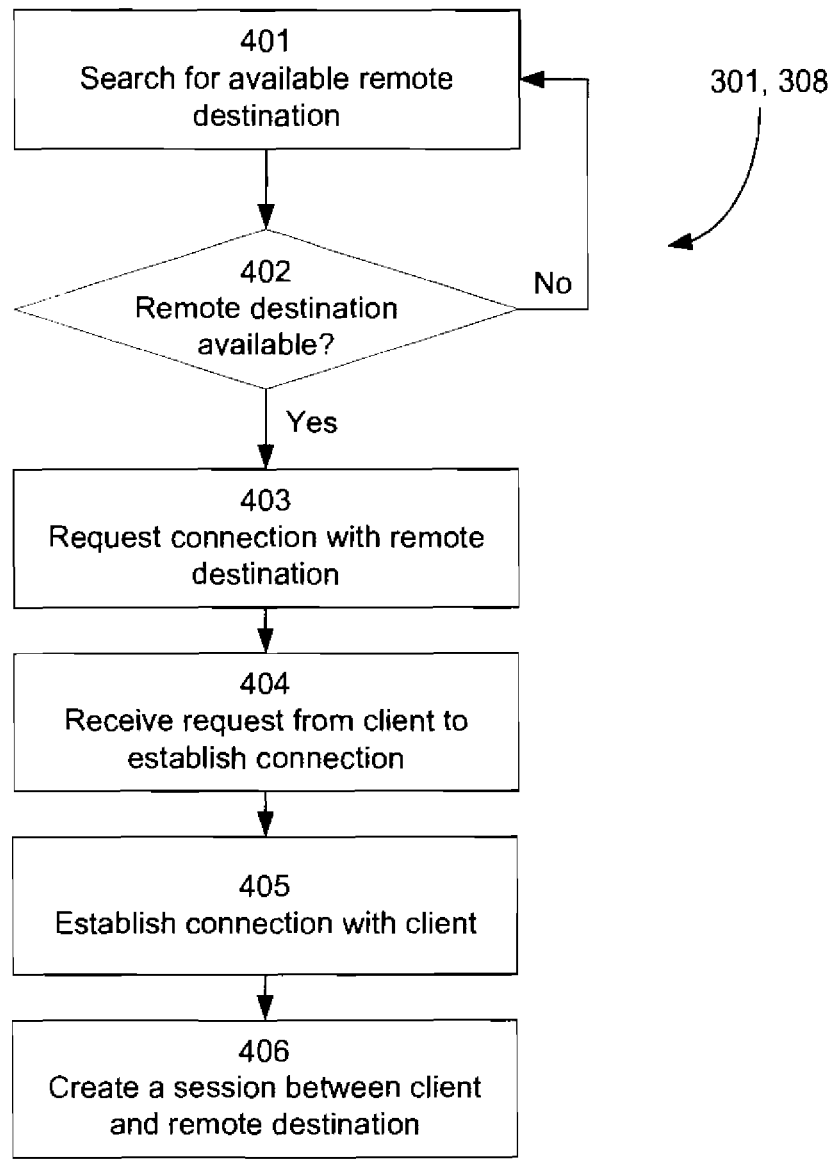
FIG. 4 illustrates an exemplary method for connecting the client 107 to the remote destination in processes 301 and 308 of FIG. 3.

First, the client 107 may need to receive RIA information in order to locally execute the RIA 204. Hence, beginning at 301, the client 107 connects to the remote destination (e.g., server 100 or client 108). FIG. 4 is an exemplary method of process 301 and process 308 (described below) of FIG. 3 for establishing a connection between the client 107 and the remote destination. Beginning at 401, the client 107 searches for an available remote destination on network 106. If a remote destination is not available at 402 (e.g., the remote destination is busy or not on the network 106), then the client 107 continues to search for an available remote destination on network 106 at 401. If a remote destination is available, then the client requests a connection with the remote destination at 403.

Proceeding to 404, the remote destination receives the request sent by the client 107. Upon the remote destination receiving the request from the client 107, the remote destination and the client 107 establish a connection at 405. The remote destination or client 107 may then create a session between the client 107 and remote destination at 406 in order to identify data transferred between the two devices. In one embodiment, creating the session includes the client 107 creating and sending a session ID to the remote destination so that the any information sent between the two devices while connected will be identified by the session ID (e.g., a signature in the header of data packets, an identifier attached to each data packet).

Referring back to FIG. 3, the remote destination transfers RIA information from the remote destination to the client 107 at 302. In one embodiment, the client 107 may request from the remote destination RIA information required to run the RIA 204 without support from or a connection to the remote destination. The remote destination may then receive the request and send the requested data (RIA information). In one embodiment, the request sent by the client 107 may include tags to identify specific RIA information to be sent. In another example, the request is generic with the remote destination understanding which RIA information is to be sent to the client 107.

Figure 5:
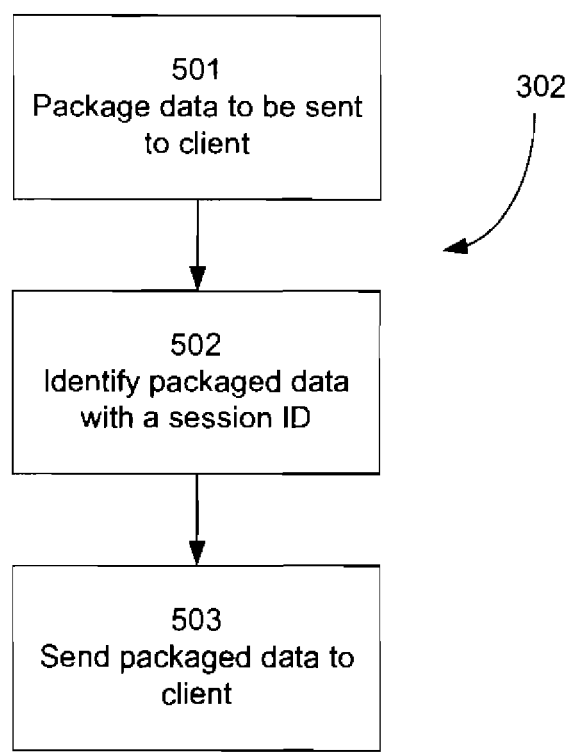
FIG. 5 illustrates an exemplary method for sending data from the remote destination to a client 107 in process 302 of FIG. 3.

FIG. 5 is an exemplary method from the remote destination side of process 302 of FIG. 3 for sending RIA information from the remote destination to the client 107. Beginning at 501, the remote destination packages data into data packets to be sent to the client 107. As previously described, the packaging application (105, 205, 211) creates the data packets. Proceeding to 502, the remote destination identifies the created data packets with the created session ID identifying the session. In one embodiment, the session ID or other identifier is attached to a header or packet body to be read by the client 107. Proceeding to 503, the remote destination sends the session identified, packaged data containing RIA information to the client 107. Multiple packets of information intended for various destinations may exist at one time or period of time on a network 106. For example, multiple client may have communications open with other clients or the server 100 during the present session.

Figure 6:
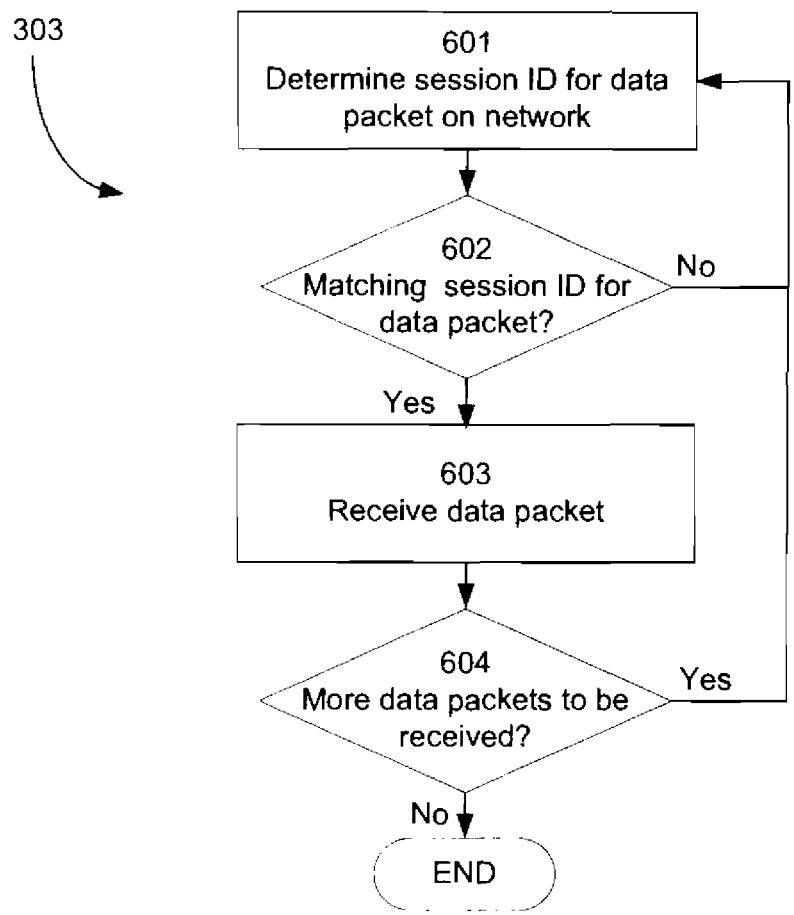
FIG. 6 illustrates an exemplary method for receiving data by the client 107 from the remote destination as in process 303 of FIG. 3.

Referring back to FIG. 3, the client 107 receives the sent RIA information at 303. FIG. 6 is an exemplary method from the client side of process 303 of FIG. 3 for receiving RIA information by the client 107 from the remote destination. Since multiple data packets may exist on the network 106, the client 107 may determine if each packet is intended for the client 107 or for a different destination. Hence, beginning at 601, the client 107 determines the session ID for an encountered data packet on the network 106. In one embodiment, the client 107 snoops each packet to determine the session ID, such as by reading portions of a header or specific positions in the packet's body. For each packet, the client 107 then determines if the session ID of the data packet matches the session ID of the session created with the remote destination at 602. If the session ID's match, then the client 107 receives the data packet as part of the RIA information requested at 603. If the session ID does not match, then process reverts back to 601 wherein the client 107 determines the session ID of the next data packet.

After receiving a data packet in 603, the client 107 determines if more data packets are to be received from the remote destination in 604. If more data packets are to be received, then process again reverts to 601, wherein the session ID is determined for the next data packet. If all data packets have been received, then the process ends. In one embodiment, the client 107 determines if more data packets exist by comparing the RIA information received to the RIA information requested. In another embodiment, the client 107 compares the size of requested RIA information to the size of received RIA information. In another embodiment, the client 107 receives a data packet from the remote destination signifying the end of transmission of requested RIA information to the client 107.

Referring back to FIG. 3, the client 107 stores the received RIA information in storage 202 at 304. In one embodiment, the packaging application 205 receives the data packets containing the RIA information and unpacks the data packets to leave the RIA information. The RIA information may then be converted by the assembler 203 from byte code to machine language for the specific architecture of the client 107. Once the RIA information is unpacked and in a format for storage, the client stores the RIA information in a portion of storage 202, such as with the RIA 204, the next available storage location, or a predetermined location in storage 202.

In one embodiment, RIA information may be persistently stored on the storage 202 of the client 107. Therefore, the data received from the remote destination may be additions, updates, or a complete overwrite to previously stored data. Since RIA information may previously exist on the client 107, the client 107 may determine if the locally stored information is more current than the received information from the remote destination. In one example, the client 107 compares the time-stamp (e.g., last date the information was modified) of the received information to the time-stamp of the locally stored information. In another embodiment, a bit-by-bit comparison is performed or the client 107 only requests information known to be out-dated and thus automatically overwrites any old information.

Proceeding to 305, the client 107 and remote destination disconnect from each other, ending the session. In an alternative embodiment, a connection continues between the client 107 and remote destination, but almost no data is transmitted between the two devices.

Executing an RIA on the Client

Proceeding to 306, the processor 201 of client 107 executes the RIA 204 stored in storage 202. Typically, as previously stated, RIAs cannot be executed while disconnected from the remote destination because the RIA requests information from the remote destination while disconnected. But as previously stated, the client 107 includes in storage 202 RIA information in order to execute the RIA 204 without being connected to the remote destination.

Figure 7:
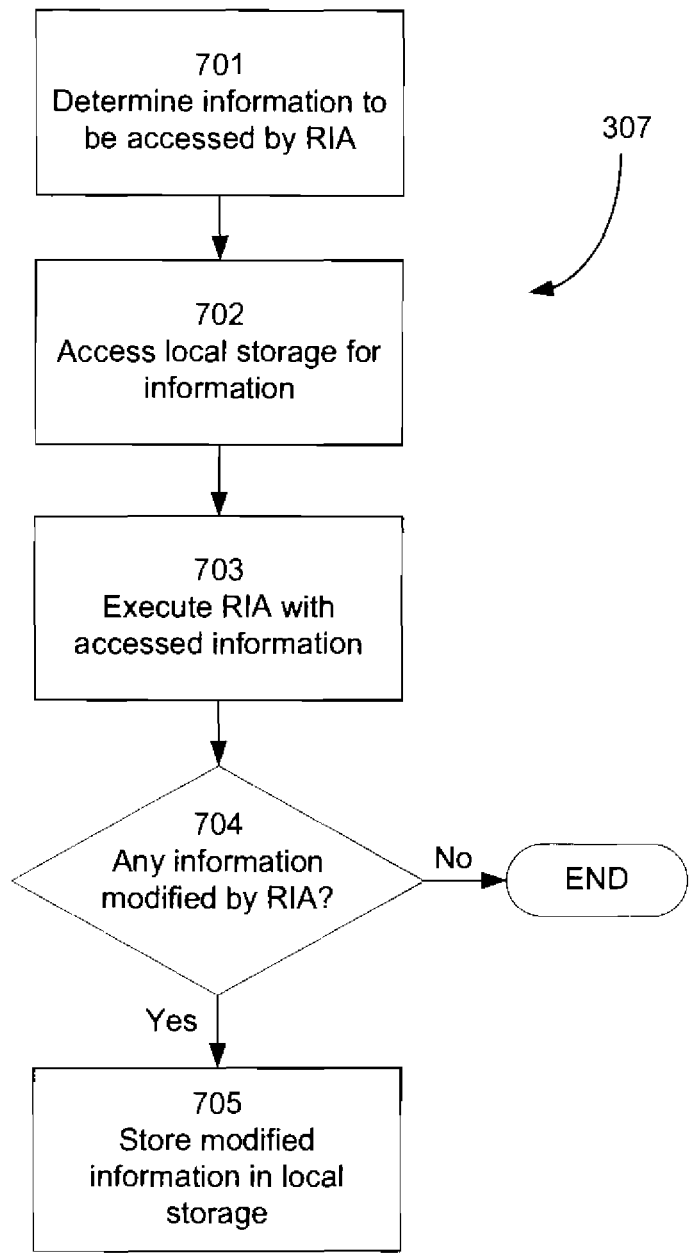
FIG. 7 illustrates an exemplary method for accessing storage 202 of the client 107 in FIG. 2 in lieu of accessing the remote destination during execution of an RIA as in process 307 of FIG. 3.

During execution of the RIA 204 on client 107, requests for access to or modification of RIA information from/to the remote destination may occur. Proceeding to 307, the client 107 may access RIA information stored in storage 202 instead of querying the remote destination for the information. In addition, the client 107 may modify the RIA information stored on storage 202 instead of requesting the RIA information of the remote destination be modified. FIG. 7 illustrates an exemplary method of process 307 of FIG. 3 for accessing storage 202 of the client 107 in lieu of accessing the remote destination during execution of the RIA 204. Beginning at 701, the processor 201 of client 107 determines what RIA information is requested by the executing RIA 204.

Upon determining what RIA information is requested, the processor 201 accesses storage 202 for the equivalent RIA information at 702. In one embodiment, if the RIA information is stored in byte code, the RIA information may be converted by the assembler 203 into machine language. Upon accessing the RIA information from storage 202, the RIA 204 continues execution with the accessed RIA information at 703. Proceeding to 704, the RIA 204 may further request modification of values of some of the RIA information during execution. If the RIA 204 does not request to amend any values of the RIA information, then process ends and no RIA information in storage 202 is updated. If the RIA 204 requests to modify a value of the RIA information, then the modified value of the RIA information is stored in storage 202 at 705. Again, the assembler 203, being executed by the processor 201, may convert the modified values into byte code to be stored in storage 202. In one embodiment, the modified value overwrites the existing value of the RIA information in storage. In another embodiment, multiple values are stored until synchronization with the remote destination. In one embodiment, the client 107 may identify modified values of RIA information (e.g., one-bit flag for each value of the RIA information) when each value is amended.

Synchronizing Remote Destination/Client for Sending RIA Information

Figure 8:
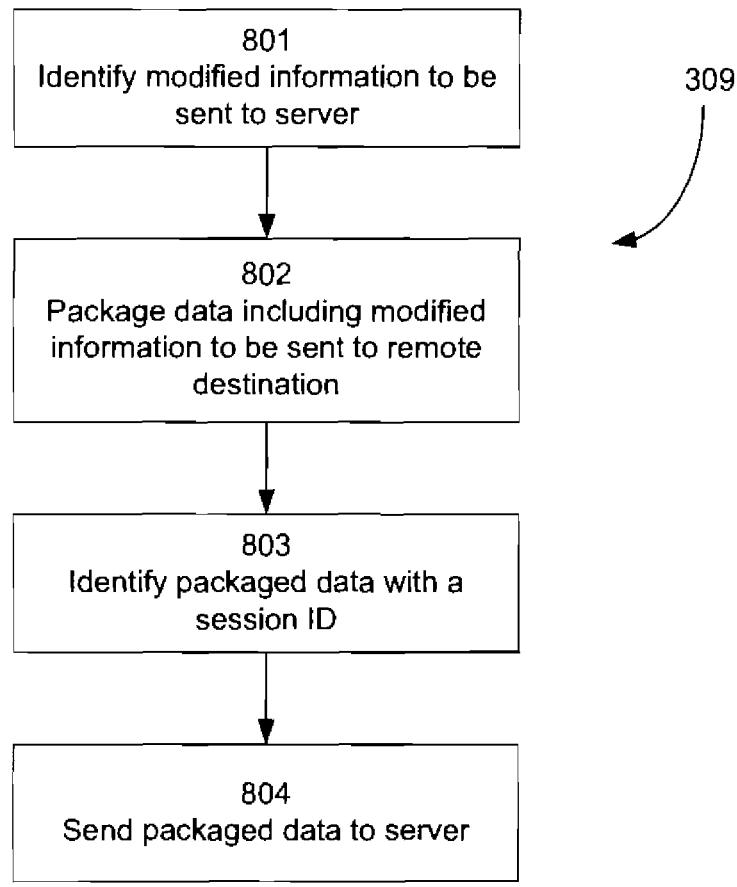
FIG. 8 illustrates an exemplary method for sending data from the client 107 to the remote destination in process 309 of FIG. 3.

Referring back to FIG. 3, the client 107 may synchronize RIA information with a remote destination after execution of the RIA, periodically, or upon determination that the RIA information has been modified. To do so, the client 107 connects to the remote destination in 308 (as previously described in relation to FIG. 4). Proceeding to 309, the client 107 sends the modified RIA information to the remote destination, FIG. 8 is an exemplary method from the client side of process 309 of FIG. 3 for sending modified RIA information from the client 107 to the remote destination. Beginning at 801, client 107 determines what RIA information is to be sent to the remote destination. In one embodiment, the client 107 identifies the modified values of the RIA information in order to send those values to the remote destination. To determine which values of RIA information have been modified, the client 107 may, for example, identify all the values of RIA information stored in storage 202 with the flags tracking changes to the values equal to one (if such flags are used). In other embodiments, the client 107 may observe time-stamps of the values of the RIA information for any stamps that are newer than when the information was received from the remote destination. In another embodiment, the client 107 may identify values of RIA information or parameters preselected by a developer 109 to always be transmitted between a client 107 and remote destination.

Proceeding to 802, the client 107 packages the identified data (modified values of RIA information) into data packets to be sent to the remote destination. As previously described, the packaging application 205 creates the data packets. Proceeding to 703, the client 107 identifies the created data packets with the created session ID identifying the session. In one embodiment, the session ID or other identifier is attached to a header or body of each packet to be read by the remote destination. Proceeding to 704, the client 107 sends the session identified, packaged data containing modified values of RIA information to the remote destination. As previously described, multiple packets of information intended for various destinations may exist at one time or period of time on a network 106.

Figure 9:
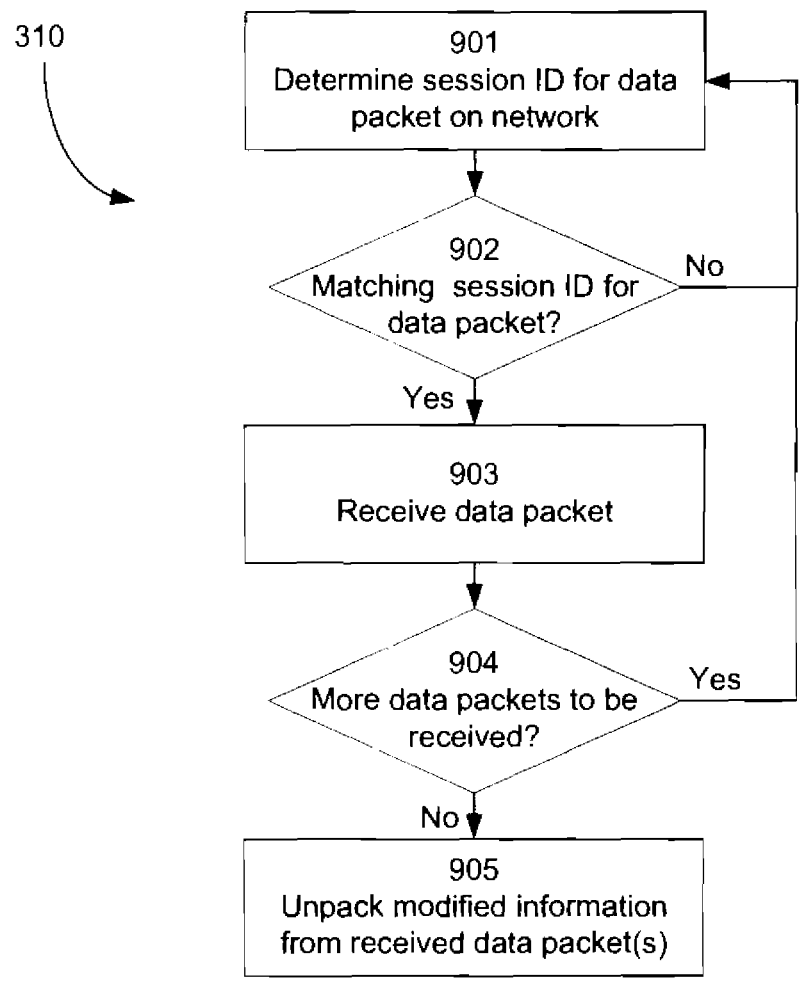
FIG. 9 illustrates an exemplary method for receiving data by the client 107 from the remote destination in process 310 of FIG. 3.

Referring back to FIG. 3, the remote destination receives the sent modified values of RIA information at 309. FIG. 9 is an exemplary method from the remote destination side of process 310 of FIG. 3 for receiving the modified values of RIA information by the remote destination from the client 107. Since multiple data packets may exist on the network 106, the remote destination may determine if each packet is intended for the remote destination or for a different destination. Hence, beginning at 901, the remote destination determines the session ID for an encountered data packet on the network 106. In one embodiment, the remote destination snoops each packet to determine the session ID, such as by reading portions of a header or specific positions in the packet's body.

For each data packet, the remote destination then determines if the session ID of the data packet matches the session ID of the session created with the client 107 at 902. In the session ID's match, then the remote destination receives the data packet as part of the modified values of RIA information to be received at 903. If the session ID does not match, then process reverts back to 901 wherein the remote destination determines the session ID of the next data packet. After receiving a data packet in 903, the client 107 determines if more data packets are to be received from the remote destination in 904. In one embodiment, the remote destination determines if more data packets exist by receiving a data packet from the client 107 signifying the end of transmission of RIA information from the client 107. If more data packets are to be received, then process again reverts to 901, wherein the session ID is determined for the next data packet. If all data packets have been received, then process flows to 905. Upon receiving all of the data packets, the data packaging module 105 may unpack the data packets to gather the modified values of RIA information in 905.

Referring back to FIG. 3, the remote destination processes the received RIA information in order to determine whether the RIA information stored in storage 102 of the remote destination should be modified or whether the received RIA information is stale and a conflict message should be sent to the client 107 in 311. In one embodiment the received RIA information may be stale if the RIA information stored on storage 102 has been updated since the time the received RIA information was modified by the client 107. For example, another client (e.g., client 108) may modify its own RIA information after client 107 modified its RIA information. The other client, though, may update the RIA information on the remote destination before the client 107 connects with the remote destination to update the same RIA information. Hence, the RIA information on the remote destination is already up-to-date and client 107's RIA information is state by the time client 107 attempts to synchronize its RIA information with the remote destination.

In one embodiment for the remote destination to determine staleness of received RIA information, the remote destination may check the time stamp of stored RIA information and received RIA information to determine when each RIA information was last modified or saved and thus which RIA information is current. The remote destination may determine that some values of received RIA information is current while other values of stored RIA information is current.

Figure 10:
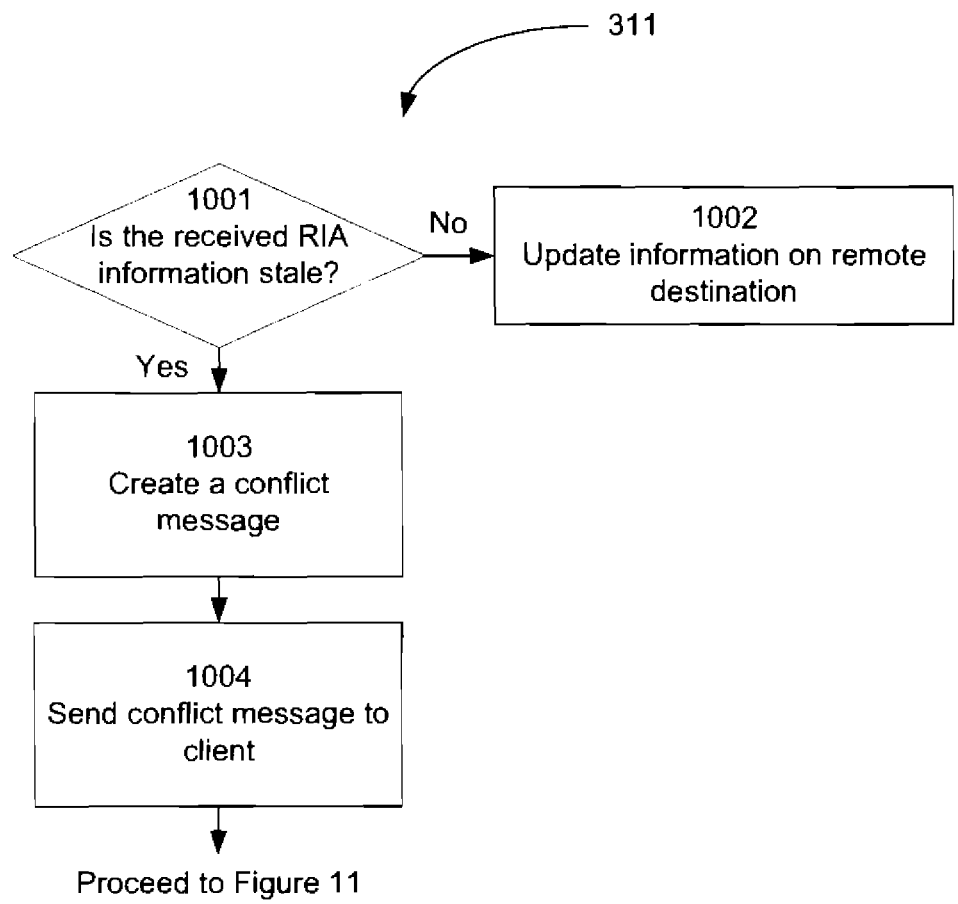
FIG. 10 illustrates an exemplary method for processing the received modified RIA information by the remote destination in process 311 of FIG. 3.

FIG. 10 illustrates an exemplary method of process 311 of FIG. 3 for processing the received modified values of RIA information. Beginning at 1001, the remote destination determines if the received RIA information is stale. If the received RIA information is not stale, then the remote destination updates the storage of the remote destination (e.g., storage 102 or storage 208) so as to store the received modified values of RIA information at 1002. In one embodiment, the modified values overwrite the previously stored values of the RIA information. In another embodiment, the remote destination allows multiple versions of a value to exist in storage for a period of time.

If the remote destination determines that at least a portion of the received modified values are stale, then the remote destination creates a conflict message to be sent to the client 107 at 1003. In one embodiment, the conflict message includes the current values stored on the remote destination for the received stale values from the client 107. The conflict message may also include other information, such as timestamps of the values stored on the remote destination, relevant to the client and/or user to review the conflict. Upon creating the conflict message, the remote destination sends the conflict message to the client 107 at 804. In one embodiment, the packaging application of the remote destination (e.g., packaging application 105 or packaging application 211) packages the conflict message into data packets identified by the session ID before sending the message to the client 107.

Figure 11:
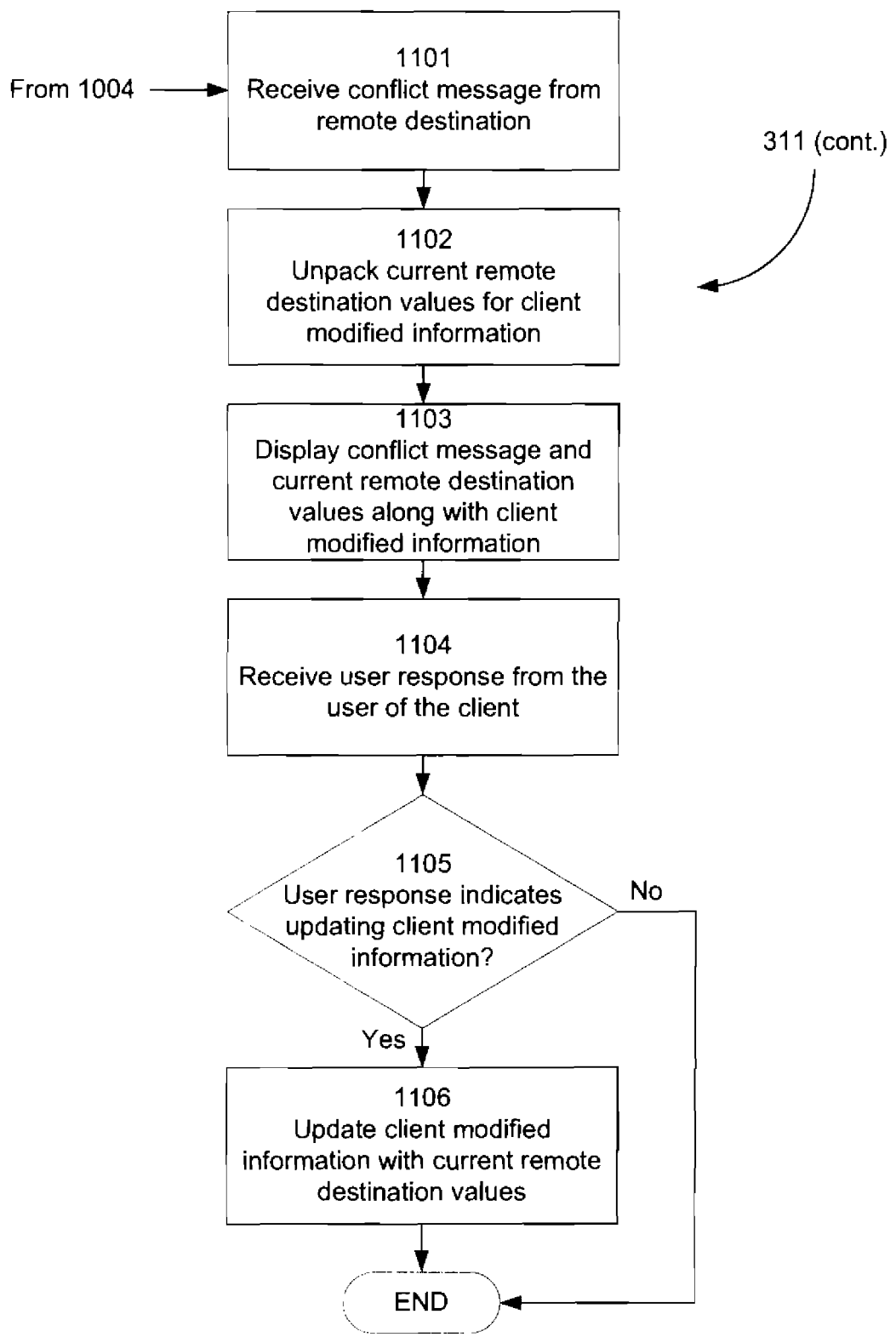
FIG. 11 illustrates an exemplary method for receiving a conflict message sent from the remote destination in process 1004 of FIG. 10 and processing the conflict message by the client 107.

FIG. 11 illustrates an exemplary method for receiving a conflict message sent from the remote destination in process 1004 of FIG. 10 and processing the conflict message by the client 107. Beginning at 1101, the client 107 receives the conflict message from the remote destination. In one embodiment, the client 107 searches the data packets on network 106 for the session ID of the open session with the remote destination until the session is closed. Thus, the client 107 may recognize that a conflict does not exist if the session closes before a conflict message is received. Upon receiving a conflict message, though, the packaging module 205 may unpack the received data packets of the conflict message to leave remaining the remote destination values of the modified information at 1102.

Upon unpacking the data packets, the client 107 may display the conflict message and the remote destination values and client values to the user 206 in 1103. In one embodiment, the user 206 is able to determine whether the values stored on the client 107 should be updated or preserved. In an alternate embodiment, the user 206 may be notified of the conflict message, and the values stored on the client 107 are automatically updated with the received values in the conflict message from remote destination. If the user 206 may determine whether the values stored on the client 107 may be updated, the client 107 awaits a response from the user 206.

After the client 107 notifies the user 206 of the conflict, the client 107 receives a user response in 1104. Upon processing the user response by the client 107, if the client 107 determines that the user 206 accepts the newly received values and allows the values previously stored on the client 107 to be updated in 1105, then the client 107 updates the previously modified values using the received updated values from remote destination at 1106. If the client 107 determines that the user 206 indicates that the RIA information in storage 202 is not to be updated in 1105, then the client 107 does not update the stored values of RIA information in storage 202 and the process ends. In another embodiment, the user 206 may determine whether portions of the modified information in storage 202 are to be updated while other portions of the modified information in storage 202 are to be preserved. In one embodiment for handling received values when the user does not wish to update the RIA information in storage 202, the client may store the conflict message in storage 202 but not update the previously stored RIA information in storage 202. Alternatively, the client 107 may discard the conflict message, thus purging the received values from storage 202.

Client Being a Remote Destination

Typically, synchronization occurred only between a server and a client. As previously stated, though, in one embodiment of the present invention, a client or other peripheral device outside of a server may be a remote destination for RIA execution or synchronization. For example, client 107 may perceive client 108 as a remote destination and synchronize with client 108 in order to receive or send updates to the RIA information or any modified values it has not yet received from/by the remote destination. Since clients may act as remote destinations in synchronization, updates or other required synchronizations. Processing power and network bandwidth required for synchronization and data transfer to/from a client may be offloaded from a server to clients (e.g., from server 100 to client 108), thus alleviating the need for every client to connect directly to the server.

In one embodiment for connecting between clients, the network between clients is a peer-to-peer network. Packets of information are periodically sent from devices in peer-to-peer networks in order to update the networked device list or other connection information. Therefore, the packets sent may be packaged with further information by the packaging application 205, including RIA information recently modified and thus the need to synchronize or version updates of RIA information between clients. Referring back to FIG. 4, client 107 searching for a remote destination may include receiving a packet broadcasted by client 108 on the network that includes the request for synchronization between the two devices in order to send a new version of RIA data to the client 107. Client 107 then attempts to connect to client 108 with client 108 presenting itself as a remote destination to the client 107. Once the RIA information is stored on client 107, client 107 may turn around and then broadcast the update to other clients, thus allowing dissemination of updates through client-to-client transactions until all target clients receive the update.

In another embodiment, a client 107 requesting connection with a remote destination in 308 may either broadcast the request on the network or may connect to a server containing a list of available devices on the network (e.g., checking a central connected device list on the peer-to-peer network). For example, if a request for RIA information sent by client 107 is received by client 108 before other devices on network 106 and client 108 determines the RIA information is stored in storage 208, client 108 may respond to the request from client 107.

In one embodiment for determining which device (server or clients) is to act as the remote destination for client 107, an algorithm may be encoded by the developer into the RIA 104, 204, 210. The determination by the algorithm may be dependent on availability of a remote destination (e.g., server 100) and availability of other devices (e.g., client 108). For example, the algorithm may be a heuristic algorithm wherein each device understands what other devices storing specific information exist on the network and their availability.

Relational Storage of RIA Information

In one embodiment, RIA information may be organized under a relational model in storage of the device. For example, each RIA (e.g., RIA 204 in client 107) may include an index of the relationship of values of the RIA information in order to organize the information. In one embodiment, the index is a root structure of tables connecting the various portions of RIA information and other data in the RIA. In one embodiment, relation model organization of RIA information allows both remote destination and client to correctly identify portions of RIA information for updating.

Atomic, Consistent, Isolated, and Durable Storage of RIA Information

Since clients may be offline from a remote destination during execution of an RIA, the transactions of the client(s) storing the RIA information may be Atomic, Consistent, Isolated, and Durable (ACID). The devices insuring ACID transactions prevents discrepancies in RIA information from occurring. Referring to atomicity of transactions, as previously stated, in one embodiment for a transaction to be atomic, all operations of the transaction must be completed in order for the transaction to be deemed complete. For example, if RIA information sent from client 107 to remote destination in 309 of FIG. 3 is interrupted so that the remote destination does not receive all of the information in 310, then all of the data transmitted between client 107 and the remote destination is invalidated and the transmission is reattempted. In another example, the modification of RIA information from a client that modified the RIA information to a remote destination must pervade through the entire network for the modified RIA information to be valid. Therefore, an update may be temporarily stored and not accessed until all devices receive the update. As such, if one device does not receive the update, then all devices on the network may reject the update and thus force the client to resend the modified RIA information to a remote destination.

Referring to consistency of a transaction, the RIA implements integrity constraints on the stored RIA information to preserve entity and relational integrity of the information. For example, the integrity constraints may prevent the RIA information from placing an RIA into an illegal state, such as accessing an invalid portion of storage or causing a divide by zero error. In another example, an RIA of a device insures that relational tables or indexes of received RIA information match the relations of stored RIA information. If a discrepancy between relations is found, then the device will not update the stored RIA information.

Referring to isolation of transactions, a device involved in synchronization is not able to view or use RIA information until after completion of the synchronization. For example, client 108 may not view modified RIA information being received from client 107 until the transfer process is ended and client 108 updates stored RIA information with the modified RIA information. In another example, the isolation of the transaction may be extended until all devices are updated with the modified RIA information.

Referring to durability of a transaction, once an update or modification of RIA information of an RIA is concluded on a device, the transaction may not be undone. For example, in one embodiment, if the RIA of a remote destination updates stored RIA information with received RIA information (1002 of FIG. 10), then the received RIA information now stored is permanent over the previously stored information. Hence, access of multiple versions of data by RIAs among devices may be prevented since only the newly stored values of RIA information is to be accessed when accessing the specific RIA information.

General

Referring back to FIGS. 1, 2a, and 2b, modules of the different embodiments of the described system may include software, hardware, firmware, or any combination thereof. The modules may be software programs available to the public or special or general purpose processors running proprietary or public software. The software may also be specialized programs written specifically for RIA execution and synchronization. For example, the processor 101, 201, 207 may be any type of module including, but not limited to, single and multiple core CPUs, such as ARMs, CISCs, RISCs, and multiprocessors, embedded circuits, or any combination thereof. In another example, client 107 illustrates a smartphone and client 108 illustrates a laptop, but a client may be any form of computing device including, but not limited to, Personal Digital Assistants, Desktops, Laptops, Cellular Telephones, Wireless IM devices, and servers.

Furthermore, storage 102, 202, 208 may be a short term memory, a persistent memory, or a combination thereof. In addition, elements of the present invention may also be provided as a machine-readable medium for storing the machine-executable instructions. The machine-readable medium and storage may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions. For example, storage may be a magneto-optical disk (persistent memory) connected to a RAM (short term memory).

In addition, a communication network, such as network 106, for transmitting/receiving information between devices may be an Internet Protocol packet switching network, including the internet or any subset of the internet, such as peer-to-peer networks or ad hoc networks, and may include any propagation medium, wired or wireless, for communication among clients 107, 108 and server 100, including, but not limited to, 802.11A, B, G, and N, 802.15, Bluetooth, Infrared, CAT5e, Optical cables, Cable, and PSTN.

For the exemplary methods illustrated in FIGS. 3-11, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented. For example, in one embodiment of the present invention, the RIA information required to run an RIA may be set by the developer. Therefore, a client 107 may automatically send a list of parameters to be sent from the remote destination to the client 107.

In another example, while it has been described that conflicts are determined after transmission of packets, a remote destination may forward information to a client before transmission of packets to determine if data is stale (and therefore does not need to be transferred to the remote destination). In another example, a remote destination may determine staleness by also checking the relational data of received modified RIA information to the relational data of stored RIA information for discrepancies. In another example, while conflicts preventing replacement of values on the server have been described, multiple versions of RIA information may persist but not be accessible until any discrepancies are resolved manually by a user or developer. In another example, types of information that may be modified, necessary for execution of an RIA, or to always be transferred during synchronization may be adjusted by the developer 109 through an Application Program Interface (API).

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A method, comprising:
providing a Rich Internet Application (RIA) information for an RIA from a remote destination to a client, wherein the RIA information is executed by the client to provide user interface functionality and processing and storing functionality of the RIA on the client;
receiving at the remote destination a client value of the RIA information from the client, wherein the client value of the RIA information is stored and modified on the client before being received by the remote destination;
determining if the client value is to replace a remote destination value of the RIA information stored on the remote destination, wherein determining if the client value is to replace the remote destination value comprises:
comparing the client value to the remote destination value;
comparing a relational data of the client value to a relational value of the remote destination value, wherein the RIA information of the client and the RIA information of the remote destination are in relational storage;
determining if the client value is more current than the remote destination value; and
determining if the relational data of the client value is the same as the relational value of the remote destination value;
replacing the remote destination value with the client value to synchronize the RIA information between the client and the remote destination when it is determined that the client value is to replace the remote destination value; and
preventing access of the client value on the remote destination and the client until completion of replacement of all remote destination RIA information to be replaced.

2. The method of claim 1, wherein the remote destination is a second client.

3. The method of claim 2, wherein the remote destination value is received by the second client from a second remote destination.

4. The method of claim 1, wherein if the remote destination does not receive all RIA information to be sent from the client to the remote destination, determining that the client value is to not replace the remote destination value.

5. The method of claim 1 wherein the RIA is a document processing application and wherein RIA comprises functionality processing and storing information for a document processed using the document processing application.

6. The method of claim 5 wherein the functionality processing and storing information is executed by the remote destination when the client is online and the functionality for processing and storing information for the document is executed by the client when the client is offline.

7. The method of claim 1 wherein the RIA is a document processing application and wherein the RIA information comprises portions of a kernel for saving and editing a document processed using the document processing application.

8. A client device comprising:
a processor;
a non-transitory computer readable medium comprising instructions comprising a Rich Internet Application (RIA) and an RIA information
wherein when executed by the processor the RIA information provides user interface functionality and processing and storing functionality of the RIA on the client device without a connection to a remote destination on a remote device, the RIA information including a first value and a relational information of the first value to the RIA information;
wherein, when executed by the processor, the RIA is configured to:
request a value stored on the remote destination;
access the first value of the RIA information on the client device in response to the request;
execute using the first value in place of the value stored on the remote destination;
modify the first value upon execution;
store the first value on the client device, wherein an unpacking application located on the client device is configured to:
receive a first data packet containing the first value and the relational information from the remote destination;
unpack the first data packet to obtain the first value and the relational information;
receive the modified first value from the RIA; and
pack the modified first value and the relational information into a second data packet to be sent to the remote destination;
send the first value to the remote destination; and
prevent access of the first value on the client device until completion of replacement of all remote destination RIA information to be replaced to synchronize the RIA information between the client device and the remote destination.

9. The client device of claim 8, further comprising:
an assembler located on the client device, the assembler configured to:
receive the accessed first value in a byte code format and the relational information;
determine from the relational information if the accessed first value is consistent;
convert the accessed first value from the byte code format into a machine language format of the client for the RIA to use during execution if it is determined the first value is consistent;
receive the modified first value in the machine language format from the RIA; and
convert the modified first value from the machine language format to the byte code format.

10. A non-transitory computer-readable medium on which is encoded program code, the program code comprising:
program code to provide a Rich Internet Application (RIA) information for an RIA from a remote destination to a client, wherein the RIA information is executed by the client to provide user interface functionality and processing and storing functionality of the RIA on the client;
program code to receive at the remote destination a client value of the RIA information-from the client, wherein the client value of the RIA information is stored and modified on the client before being received by the remote destination;
program code to determine if the client value is to replace a remote destination value of the RIA information stored on the remote destination, wherein the program code to determine comprises:
program code to compare the client value to the remote destination value;
program code to compare a relational data of the client value to a relational value of the remote destination value, wherein the RIA information of the client and the RIA information of the remote destination are in relational storage;
program code to determine if the client value is more current than the remote destination value; and
program code to determine if the relational data of the client value is the same as the relational value of the remote destination value;
program code to replace the remote destination value with the client value to synchronize the RIA information between the client and the remote destination if determined that the client value is to replace the remote destination value; and
program code to prevent access of the client value on the remote destination and the client until completion of replacement of all remote destination RIA information to be replaced.

11. The non-transitory computer-readable medium of claim 10, wherein the remote destination is a second client.

12. A method comprising:
using Rich Internet Application (RIA) information on a client device to provide user interface functionality and processing and storing functionality of an RIA on the client device without a connection to a remote destination on a remote device, the RIA information including a first value and a relational information of the first value to the RIA information; and
executing the RIA on the client device to:
request a value stored on the remote destination;
access the first value of the RIA information on the client device in response to the request;
use the first value in place of the value stored on the remote destination;
modify the first value upon execution;
store the first value on the client device,
send the first value to the remote destination; and
prevent access of the first value on the client device until completion of replacement of all remote destination RIA information to be replaced to synchronize the RIA information between the client device and the remote destination; and
executing an unpacking application located on the client device to:
receive a first data packet containing the first value and the relational information from the remote destination;
unpack the first data packet to obtain the first value and the relational information;
receive the modified first value from the RIA; and
pack the modified first value and the relational information into a second data packet to be sent to the remote destination.

* * * * *